United States Patent [19]

North

[11] Patent Number: 4,796,187

[45] Date of Patent: Jan. 3, 1989

[54] METHOD FOR PROCESSING IMAGE DATA TO SELECT A TARGET AIMPOINT

[75] Inventor: David M. North, Canoga Park, Calif.

[73] Assignee: Hughes Aircraft Company, Los Angeles, Calif.

[21] Appl. No.: 946,233

[22] Filed: Dec. 24, 1986

[51] Int. Cl.[4] .......................... F42B 15/00; H04N 3/00
[52] U.S. Cl. ..................................... 364/423; 364/516; 358/126
[58] Field of Search ................. 364/516, 423; 358/126

[56] References Cited

U.S. PATENT DOCUMENTS

| | | | |
|---|---|---|---|
| 3,950,611 | 4/1976 | Callis et al. | 358/126 X |
| 4,123,017 | 10/1978 | Lewis et al. | 358/126 X |
| 4,219,847 | 8/1980 | Pickney et al. | 358/126 |
| 4,424,588 | 1/1984 | Satoh et al. | 364/516 X |
| 4,549,211 | 10/1985 | Assael et al. | 358/126 |

OTHER PUBLICATIONS

Automatic Target Recognition: State of the Art Survey; Bir Bhanu; IEEE Transactions on Aerospace and Electronic System; vol. AES-22, No. 4; Jul. 1986; pp. 364–379.

Primary Examiner—Allen MacDonald
Attorney, Agent, or Firm—M. W. Sales; R. A. Hays; A. W. Karambelas

[57] ABSTRACT

A method for operating a target tracker and processing the image data received from its sensor to select the target from the clutter and to select an aimpoint on the target of particular utility. The method processes the gaps between image segments on a given horizontal scan line. The processing proceeds from left to right across the scanned scene. Hence when a gap is located which has its center located to the right of the center of the image scene, the image segment to the left of the gap is the segment closest to the horizontal center of that line of data. Sucessive lines of data are processed to locate the centermost target segment. If such successive target segments are contiguous they are combined and processed as a target to determine an aimpoint which is the median of the target. Operating according to this method the tracker will select those contiguous image segments which are located closest to the center of the image scene and will select the target median as the aimpoint on the target.

9 Claims, 5 Drawing Sheets

X-MEDIAN CALCULATION ( MAY REQUIRE ITERATION )

| HALF AREA = ( TARGET AREA) / 2 + 1<br>Σ AREA = 0 | 100 |
| --- | --- |
| REPEAT FOR EACH LINE | 102 |
| Σ AREA = Σ AREA + (LINE AREA TO RIGHT OF X-CENTER)<br>− (LINE AREA TO LEFT OF X-CENTER) | 104 |
| X-MEDIAN = X-CENTER + $\dfrac{\Sigma\ \text{AREA}}{2 * (\text{NUMBER OF LINES})}$ | 106 |

Fig. 5.

Y-MEDIAN CALCULATION

| HALF AREA = ( TARGET AREA)/ 2 + 1<br>Σ AREA = 0 | 110 |
| --- | --- |
| REPEAT | 112 |
| INCREMENT LINE NUMBER<br>Σ AREA = Σ AREA + LINE AREA | |
| UNTIL Σ AREA ≥ HALF AREA | 114 |
| Y-MEDIAN = LINE NUMBER | 116 |

METHOD FOR PROCESSING IMAGE DATA TO SELECT A TARGET AIMPOINT

The United States Government has rights in the invention disclosed herein which was made during the performance of a contract awarded by the Unitd States Air Force.

FIELD OF THE INVENTION

This invention relates to methods for processing data orginating from an imaging seeker device such as an imaging infrared device or a visual video device and possibly can be applied to other devices such as radar. The processed data is representative of the image content of a scene viewed by the seeker. More particularly, the invention relates to a method for distinguishing a selected target image from other images (clutter) in the scene and for selecting an aimpoint on the target of particular utility.

RELATED ART

Various imaging seeker/tracker systems are well known and used to guide missiles or other vehicles to their targets. One such system is referred to as a Gated Centroid Tracker. It is the function of such systems to process electrical signals representative of the image content of a scene viewed by the seeker and to select the target from among all other images in the scene and to select a specific aimpoint on the target.

In the gated centroid tracker, the primary method of distinguishing the target from non-target (i.e. "clutter") images is the mathematical formation of what is commonly referred to as a "gate" around the target. Any images located outside the gate are assumed to be clutter and are ignored when performing new aimpoint calculations. Such a technique is effective only if there is adequate separation between the target and the clutter. However, the performance of such a tracker may be degraded by the clutter if the clutter is close enough to the target to enter the gate. If clutter enters the gate, the gate may be "stolen" by the clutter resulting in an unacceptable aimpoint. Also, because the gated centroid tracker uses the mathematical centroid of the target as its aimpoint, the calculation of the aimpoint can be severely compromised by long target image slivers protruding from the main body of the target.

It is the objective of this invention to provide a seeker/tracker which is not susceptible to gate stealing and which uses the mathematical median of the target image as the target aimpoint.

SUMMARY OF THE INVENTION

The present invention comprises a seeker/tracker system for generating signals representative of the image content of a scene viewed by the system, together with means for processing such signals and controlling the aimpoint of the seeker so as to overcome the disadvantages discussed above. The method of the invention examines the various images in a viewed scene and selects those image segments which are contiguous and nearest to the center of the scene for further processing as the selected target. A unique probability function is thereby assigned which provides for a step increase in the probability of a segment being a target segment for those image segments which are contiguous and closest to the center of the scene (the presumed target aimpoint). A weighting function is used to determine how much influence a segment has on the calculation of a new aimpoint. The weighting function assigns the same weight to all such contiguous and central image segments and assigns zero weight to image segments which are not contiguous and centrally located. The image segments are processed to calculate a new aimpoint located at the mathematical median of the target image. Such a seeker tracker system can be referred to as a "contiguous median tracker", and is not susceptible to "gate stealing".

DETAILED DESCRIPTION OF THE INVENTION

The centroid gated tracker is, under some conditions, susceptible to "gate stealing". This occurs when a large non-target image is close enough to the target image that an edge of the object just enters the gate. Even a small piece of the non-target object, at the edge of the gate, has a sizeable influence on the calculation of the location of the centroid (or aimpoint). The calculation of the aimpoint takes into account the presence of the non-target near the edge and calculates a new aimpoint which moves the gate toward the nontarget. Thus, during the next scene frame, more of the non-target is included in the gate and the situation compounds itself.

Figure 1A:
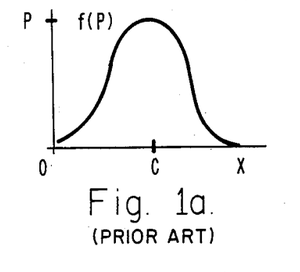
FIGS. 1a and 1b depicts the probability distribution (1a) and the weighting function (1b) as used in processing pixel data in a Gated Centroid Tracker.

FIG. 1a is a probability function that would be expected of typical tracker, illustrating the probability that an image located in the scene at position x is in fact part of the target. Thus, an image present at $x = C$ (i.e. the horizontal center of the scene) is expected to have a higher probability of actually being part of the target. An image near the edge of the scene (e.g. near o or x) is expected to have a lower probability.

Figure 1B:
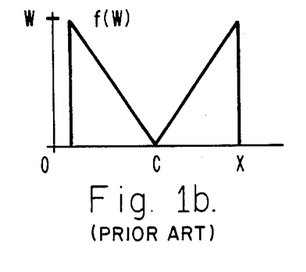

FIG. 1b represents a weighting function as used in a typical centroid gated tracker. Thus, the weight that an image segment is assigned in calculating the new aimpoint varies depending on its position in the scene. An image segment near the horizontal center of the scene (i.e. at $x = c$) is assigned a weight of zero. It has no weight in calculating the new aimpoint. An image segment near the edges (i.e. near $x = o$ or $x = x$) is assigned a very high weight in calculating a new aimpoint.

Note that the weighting function is roughly the reciprocal of the probability function. In other words, if non-target segments enter the gate they have a stronger influence on the calculation of the new aimpoint than do the target segments. This contributes to the phenomenon known a "stealing the gate" as illustrated in FIGS. 2a, 2b and 2c.

Figure 2A:
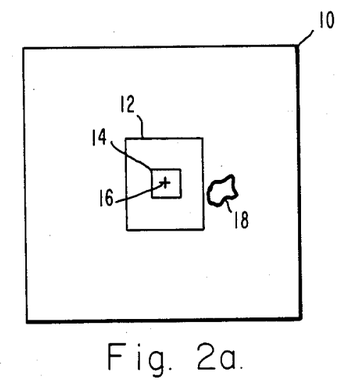
FIGS. 2a, 2b, and 2c illustrate the phenomenon of "gate stealing".

The "gate stealing" begins as shown in FIG. 2a. The seeker/tracker views a scene 10 which may include many potential targets and some clutter. The effect of these additional targets and clutter on the calculation of the aimpoint on the selected target 14 is theoretically held to a low level by mathematically generating a gate 12 around the target. All targets and objects outside the gate are rejected as clutter and are not further processed. A typical object of clutter such as clutter 18 may be located just outside the gate and may be of substantial size and sufficiently large to generate an image which will result in gate stealing should that clutter image enter the gate.

Figure 2B:
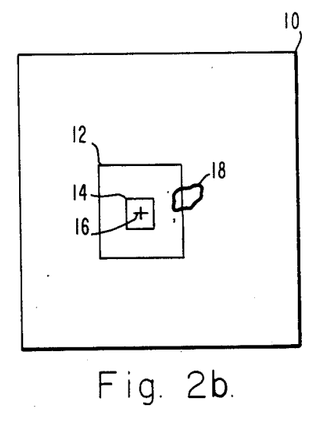
Figure 2C:
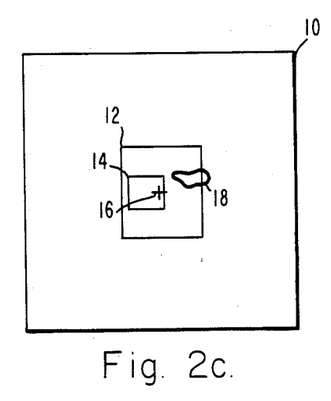

FIG. 2b shows that due to target 14 movement or movement of clutter 18, an edge portion of clutter 18 has entered the gate 12. Because that edge portion of clutter 18 has entered the gate, it is further processed to calculate a new target aimpoint 16. The weight given to the edge portion is very high as shown by the weighting function of FIG. 1b. Thus, a new aimpoint is calculated as lying closer to clutter 18. The gate and aimpoint are thus shifted toward clutter 18 as shown in FIG. 2c. Thus target 14 appears to be to the left of center of gate 12. The aimpoint 16 has shifted toward clutter 18 and almost off of target 14. Gate 12 has shifted torward clutter 18 and hence a larger portion of clutter 18 now appears within the gate 12. This larger portion of clutter 18 now has a larger influence on the calculation of the succeeding aimpoint, and hence the "gate stealing" compounds itself.

The method of the present invention processes the image data in a scene in a manner which eliminates "gate stealing" and also calculates a target aimpoint which is more efficient than is the calulation of the target centroid. The method of the invention is preferably implemented through software and specifically through a first algorithm referred to as the Continguity algorithm, and a second algorithm referred to as the Median algorithm.

The Contiguity Algorithm

Figure 3:
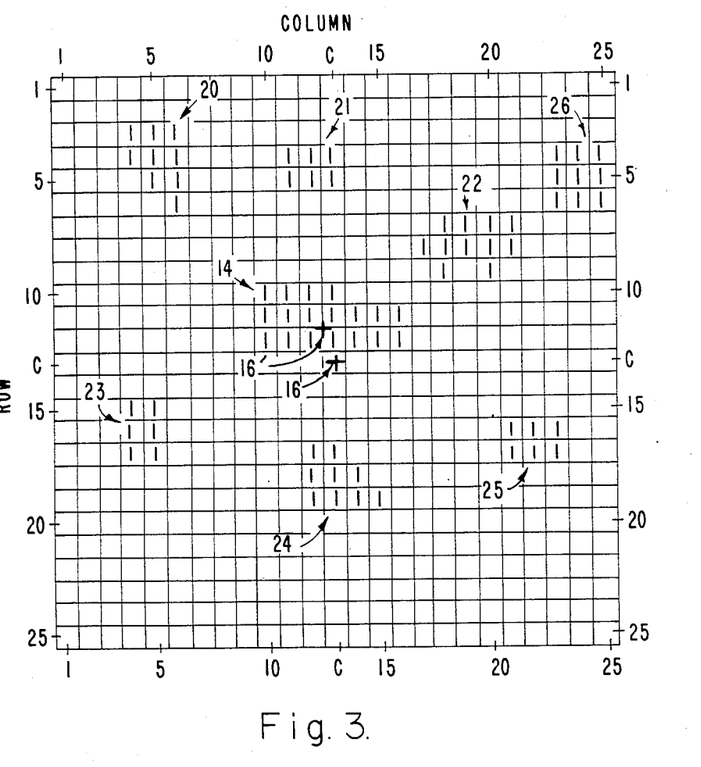
FIG. 3 illustrates a hypothetical scene viewed by a seeker/tracker to be subjected to analysis by the method of the invention.
Figure 4:
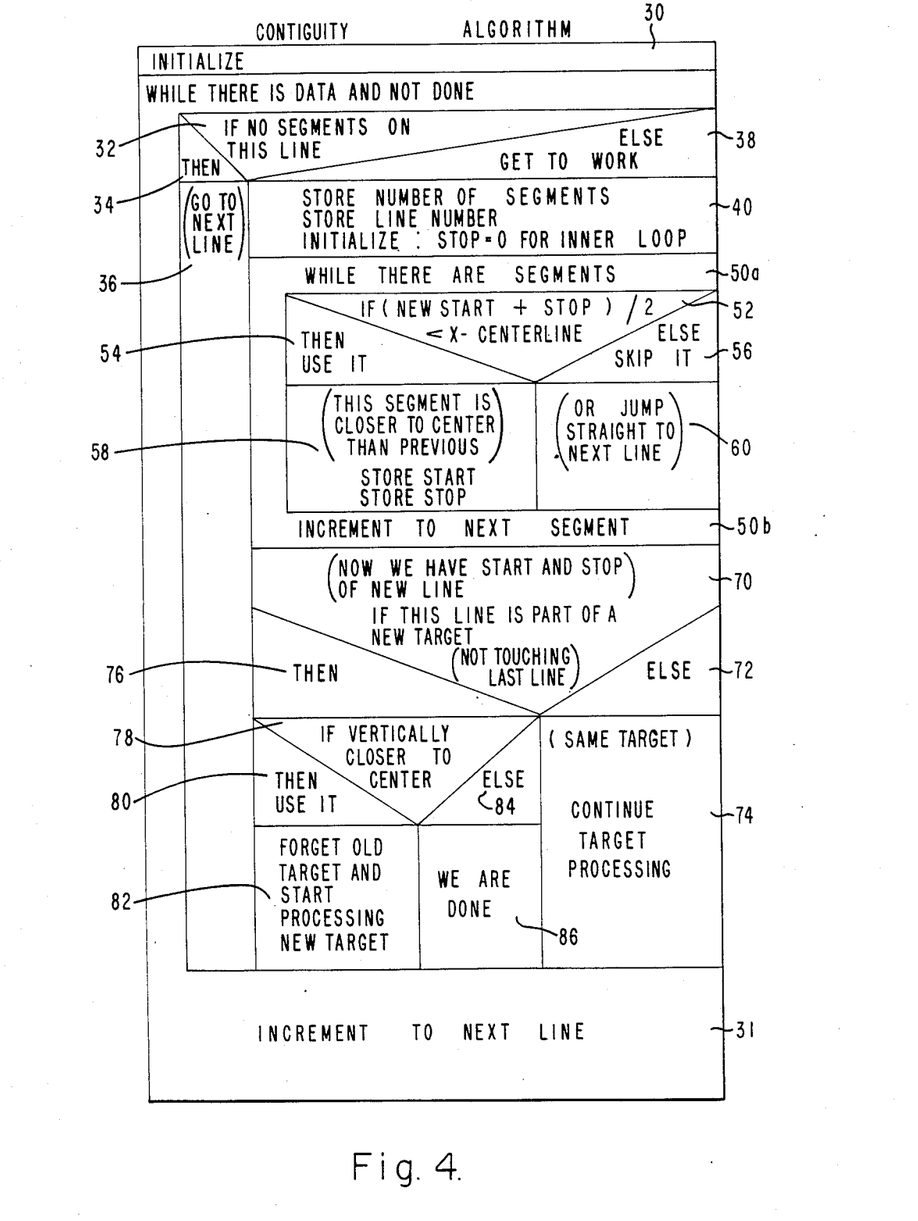
FIG. 4 illustrates the method of calculation of the contiguity tester.

The function of the contiguity algorith is to find the single set of image segments that are contiguous and closest to the point where the target is believed to exist (i.e. the aimpoint of the previous image frame). Once such single set of image segments is located, all other image segments are rejected as clutter. Since the contiguity algorithm serves to reject all clutter, it should be evident that the algorithm can be used with or without a "gate". The algorithm will operate faster to locate the target if a "gate" is used since the gate would perform a "first cut" and eliminate the need for the algorithm to process many clearly clutter objects. However, the gate is not necessary. The algorithm can use the entire scene of the seeker for its processing and function to properly reject clutter. A hyoothetical scene as viewed by the seeker is illustrated in FIG. 3. FIG. 3 shows objects 20-26 and target object 14. Also shown are a previous aimpoint 16 and a new aimpoint 16' calculated based on the information content of the scene. The algorithm which selects object 14 as the most probable target is best described with reference to the flow chart of the algorithm as shown in FIG. 4. Before getting into the details of FIG. 4, some preliminary operational information must be understood.

The algorithm picks the contiguous image set which is closest to the aimpoint by keeping track of, and processing data representative of the gaps between image sets.

As a line (or file) of image data is processed from left to right, each image segment on that line is compared to the previous image segment on that line. If the gap between the two segments is to the left of the gate center, then the old segment is rejected and the new segment is saved. If the gap is to the right of center, then processing is complete for that line since the segment closest to the center has already been found and saved. No subsequent segments can possibly be closer. As a result of this processing, only one segment per line is retained. While this may disregard target appendages, it will not throw-out the main body of the target. This method of processing the scene data is graphically illustrated by the flow chart of FIG. 4.

Beginning in box 30 various parameters, counters and constants are set to their initial values. Then, while there is still data in the scene and the DONE flag has not yet been set true, we examine the current data line to determine whether there are any image segments on the line. This decision is represented in box 32. If the decision is that there are no image segments on the line (box 34) then we proceed to the next data line (box 36). However, if there are image segments on the line then we must begin processing them (box 38). As used in this description, an image segment refers to one or more pixels whose state indicates that an object has been detected at a corresponding position in the field of view of the seeker. In FIG. 3, the pixels at location row=3, column=4, 5 or 6 are such pixels. Thus a 1 in a pixel box indicates the detection of an object (potential target).

The processing of data representative of images detected during the scan of a particular line in the image begins with the description contained in box 40. The number of image segments located on the line is determined and stored, as is the number of the line. For each image segment, a beginning and ending pixel location is stored. The data so stored is processed to determine which segment on the line is located closest to the centerline (aimpoint) of the image by the procedure indicated in boxes 50 through 60. Boxes 50a and 50b define a loop procedure. So long as there remain segments on a line which have not yet been analyzed (box 50a) the procedure in boxes 52 through 60 is followed. An option is to skip the rmaining segments when a segment to the right of the centerline is found. This may save some processing time. This option is shown is parentheses in FIG. 4. After each segment is analyzed the procedure increments to analyze the next segment (see box 50b).

Based on the data defining the start and stop pixel for each segment, the locations of the center of the gaps between segments are determined and used to select the segment closest to the centerline. For the purpose of this analysis the first pixel in each line is always designated as the first STOP for that line. To illustrate the procedure let us analyze scene line four of FIG. 3. There are three segments on line four. Pixel 1 is identified as the first STOP. Pixel 4 is identified as the START of segment one and pixel 6 is the STOP of segment one. The second segment has START at pixel 11 and STOP at pixel 13. The third segment is defined by START at 23 and STOP at 25.

The first gap between segments is defined by the first STOP (which is pixel 1) and the new START of the next segment (which is pixel 4). The center point of the gap is thus determined by (new START+STOP) divided by 2 (see block 52). In this case the center of the first gap is calculated to be (4+1)/2=2.5. Because the center of the gap (at 2.5) is located to the left of the center pixel (i.e. pixel 13 in FIG. 3) the next segment, defined by START pixel 4 and STOP pixel is closer (on the x or horizontal axis) to the center than any previous segment. In FIG. 4 the decision in box 52 would be true and we procede to box 54 and 58 which stores the START and STOP locations of the segment. Proceding to box 50b we increment to the next segment by analyzing the next gap. The next gap is defined by the STOP of the last stored segment (i.e. pixel 6) and the new START of the next segment on the line, which for line 4 is pixel 11. Box 52 finds the center of the new gap to be (11 plus 4) divided by 2 or 7.5. Since 7.5 is located to the left of center (pixel 13) the next segment, defined by pixels 11 through 13 must be located closer to the center than the previous segment (pixels 4–6). Box 58 stores the START and STOP of the next segment (START=11, STOP=14) and we increment to the next and final segment, via boxes 50b and 50a. The next gap is defined by STOP=14 and the START of the last segment (START=pixel 23). Box 52 calculates the center of the gap to be (23 plus 14) divided by 2, or 18.5. But 18.5 is greater than 13. Thus the center of this gap lies to the right of the center of the scene and the decision in Box 52 is thus false. Proceding through boxes 56 and 60 we either jump directly to the next line of pixels (if the line just completed was the first line of a new target image) or we now determine whether the segment just stored is contiguous to the segment previously stored. This can be done by comparing the pixel numbers of the stored segment on the current line with the pixel numbers of the stored segment on the previous line. If there are any common numbers the segments are determined to be contiguous. This criteria may vary. Overlap may be required or small gaps may be allowed. Small numbers of lines with no segments may also be allowed. The test for contiguity is made in box 70.

If the segment is contiguous then we branch through boxes 72 and 74 and the line number and START and STOP of the segment are stored with the line number and START and STOP numbers of the contiguous segment and processed as a candidate target entity. Then we increment to the next line number and repeat the process.

If the segment is not contiguous then the segment forms a part of a potentially new target. We branch through box 76 to box 78. Here we test to see whether the new non-contiguous segment is vertically closer to the vertical center point of the scene than the previous candidate target was. This can be done in a manner very similar to the method described above for determining which segment on a line is closest to the horizontal center. Thus, if the row number of the non-contiguous segment plus the last row number of the previous candidate target divided by two results in a row number less than (above) the row number of the vertical center of the scene, then the new non-contiguous segment is closer to the vertical center of the scene. In this case we branch through box 80 to box 82. We forget about the old candidate target, i.e. we erase the START, STOP and line numbers of the segments previously stored as the candidate target and replace them with the corresponding data of this non-contiguous segment which becomes the new target candidate. We continue to process the segments on the remaining lines (box 31) until we run out of lines or we determine in box 78 that the next candidate target is not vertically closer to the vertical center of the scene. In the latter case, we branch through box 84 to box 86 where we determine that we are done processing the data to locate our target image. We have now located that candidate target image which is closest to the centerpoint of the scene, with vertical closeness taking precedence over horizontal closeness.

We are now ready to process the data representative of our selected candidate target to calculate the desired aimpoint on the target. This data has been systematically stored as indicated by the procedures in boxes 74 and 82, and comprises the START and STOP pixel locations for the set of contiguous target pixels last judged as being closest to the center of the scene. Knowledge of the START and STOP pixel locations completely defines the extent of the candidate target and is used to determine the aimpoint in the median calculation routines. These routines, one for the x-median and one for the y-median are illustrated in flow diagram format in FIGS. 5 and 6 respectively.

X-Median Calculation

Figure 5:
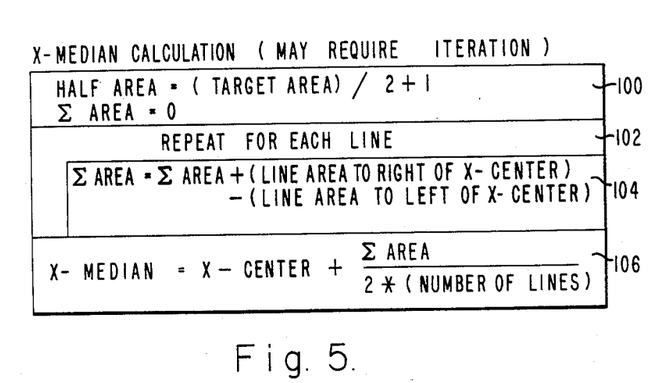
FIG. 5 illustrates the method of calculating the X-axis (horizontal) median position.

The algorithm for calculation of the median point on the target in the horizontal direction is illustrated by the flow diagram of FIG. 5. Once the target has been identified and its boundary defined by the various START and STOP points of its segments it is a trivial matter to calculate the number of pixels contained within the area of the target.

The algorithm presented in FIG. 5 results in an approximation of the x-median on the first pass through. Several passes may be required if greater accuracy is required, particularly if the target is of a shape such that some of the lines of the target do not cross the center of the field (i.e. the center in the x direction). When consecutive passes through the algorithm result in the calculation of the same x-median, then computation (iteration) can stop and the calculated x-median is used.

A sample calculation of x-median will serve to illustrate the algorithm depicted in FIG. 5. The parameter $\Sigma$ AREA is initialized to zero in box 100. For each line of the selected target, the parameter $\Sigma$ AREA is increased by the line area to the right of X center ($x_c$) and decreased by the line area to the left of X center. For example, refer to target 14 in FIG. 3. Target 14 occupies 3 lines, lines 10, 11, and 12. Assume that previous calculations indicate that the target median is located at the center of pixel (13, 13). To calculate the new X median we proceed to box 100 of FIG. 5 and initialize $\Sigma$ AREA=0. Following the instructions in boxes 102 and 104, we then modify $\Sigma$ AREA by adding the line area to the right of X center ($X_c$=pixel 13) and subtracting the line area to the left of X center. This is repeated for each line of the target. Thus, for target 14 in FIG. 3 we perform the following operations:

set $\Sigma 0$ AREA=0
for line 10, $\Sigma$ AREA=0+0−3
  or $\Sigma$ AREA=−3
for line 11, $\Sigma$ AREA=−3+3 −3
  or $\Sigma$ AREA=−3
for line 12, $\Sigma$ AREA=−3+3 −3
  or $\Sigma$ AREA=−3

Once we have incremented through all lines of the target and have a new value for $\Sigma$ AREA, we proceed to box 106 to calculate our new X-median. Since our first X median was assumed to be the center $X_c$ (i.e. the pixel in column 13) we calculate our new X-median as:

$$X \text{ median} = X_c + \frac{\Sigma \text{ AREA}}{2 * (\text{numbers of lines})}$$
$$\text{or} = X_c + \frac{-3}{2 * (3)}$$
$$= X_c - \tfrac{1}{2}$$

So our new X-median is: $X_c$, which was 13, minus $\tfrac{1}{2}$ or $X_m = 12\tfrac{1}{2}$.

If target 14 had been irregularly shaped or positioned, such that one or more of its rows did not contact the center column, then iteration would be required. We would then use our new $X_c = 12\tfrac{1}{2}$ as if it was a previously calculated median and perform the operations in FIG. 5 again to calculate another X median. When two successive calculations agree within an acceptable error range, the new median point has been determined. The calculated X median, whether obtained by one pass through the algorithm of FIG. 5 or by more than one pass (if necessary) is then the X coordinate of the desired target aimpoint.

Y-Median Calculation

Figure 6:
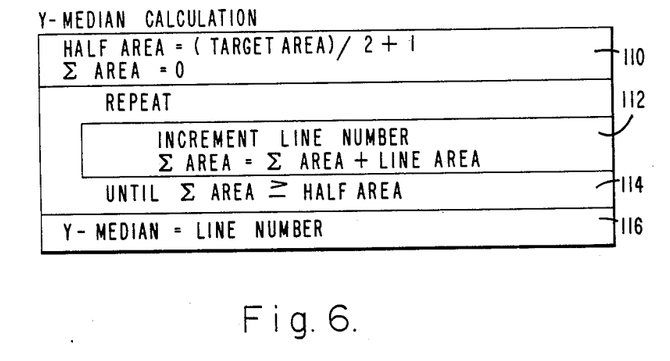
FIG. 6 illustrates the method of calculating the Y-axis (vertical) median position.

The algorithm for calculation of the median point on the target in the vertical direction is illustrated by the flow diagram of FIG. 6. Once the target has been identified and its boundary defined by the various START and STOP points of its segments, the total target area is calculated as indicated with respect to the description of the X-median calculations. For calculation of the Y-median we calculate a new parameter HALF AREA as shown in box 110 of FIG. 6. HALF AREA is the target area divided by two, plus one. This addition of one is prefered for round off considerations, but is not a requirement. Σ AREA is again initialized to zero.

For each horizontal line of the target we increment the current line number by one (1) and increase Σ AREA by the area of the target on that line (i.e. the number of pixels in the line whose logical state indicates the presence of the target at the corresponding location in the image scene). These operations are depicted in box 112 of FIG. 6. The procedure is repeated for each line of the target until the updated quantity Σ AREA is greater than or equal to HALF AREA. The iteration and logical test are shown in box 114 of FIG. 6. When the test in box 114 is true then the current line number is the line number of the Y-median, as indicated in box 116. Interpolation may be used to achieve greater accuracy.

The coordinates of the median of the target are then X-median and Y-median, and constitute the calculated aimpoint on the target.

Figure 7A:
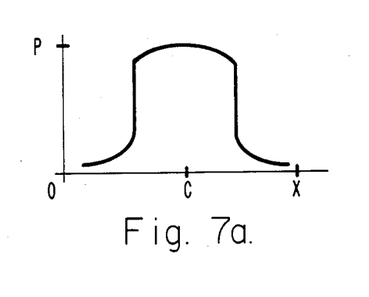
FIGS. 7a and 7b depict the resulting probability distribution and weighting function as used in processing pixel data to generate a new aimpoint.
Figure 7B:
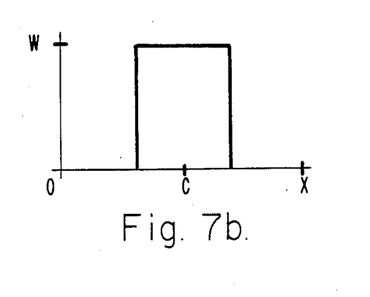

Upon careful consideration it can be seen that implementation of the above described method for processing the pixel data inherently implements the desired probability distribution and weighting function shown in FIGS. 7a and 7b respectively. By way of illustration, the above method ignores all pixels except those which are part of the centermost contiguous image, once that image has been located. The method thus implements a step function at the boundary of that image and gives no weight to pixels outside the image when calculating the new aimpoint.

Figure 8:
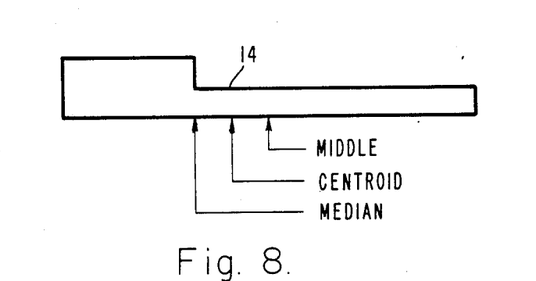
FIGS. 8, 9, and 10 show the location of the aimpoint if calculated using a middle, centroid and median calculation for targets of selected shapes.
Figure 9:
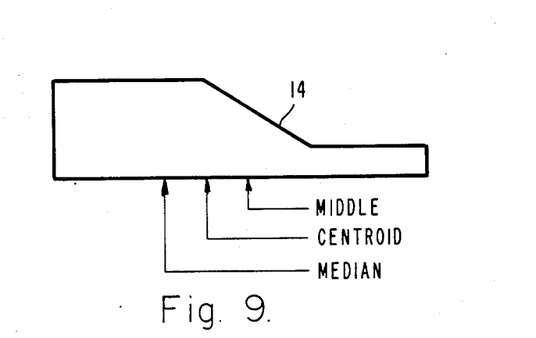
Figure 10:
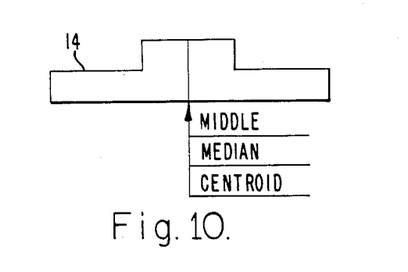

Another significant feature is the fact that the above processing method calculates a target aimpoint at the geometric median of the target. The location of the median can be compared to the location of the middle and centroid for various target shapes by inspection of FIGS. 8, 9 and 10. In all cases it is clear that the median is closer to the center of the bulk of the target than is the middle or centroid except in FIG. 10 where all three are equal. Thus use of such a method will always result in an aimpoint at least as good as the centroid and in most cases will produce a better aimpoint.

While the invention has been described with reference to a preferred embodiment as illustrated by the figures, it should be evident that many changes and alternative embodiments could be implemented by one of ordinary skill in the art without departing from the spirit and scope of the invention as defined in the appended claims.

What is claimed is:

1. A method for processing data representative of the image content of a scene viewed by a sensor device for the purpose of selecting a target aimpoint, said method comprising:
   first processing said data to select a unique contiguous image which is located closest to the center of the scene; and
   further processing the data representative of said unique contiguous image to select the geometric median of the contiguous image as the target aimpoint.

2. The method of claim 1 wherein said first processing step includes processing data representative of a plurality of images to locate the horizontal center of the gaps between the images and, upon first locating a gap whose center is located to the right of center of the image scene, designating the image at the left side of the gap as the image closest to center.

3. The method of claim 1 and wherein the first processing step includes the step of analyzing image data from successive vertically related lines in said scene to determine whether the centermost image in one line is contiguous with the centermost image in the next line.

4. The method of claim 3 wherein if it is determined that said centermost images in successive vertical lines are contiguous, designating said contiguous images as the target.

5. The method of claim 3 wherein if it is determined that said centermost image in one line is not contiguous to the centermost image in the next line, the further step of determining whether the centermost image in said next line is closer to the vertical center of said scene and if so, designating it as the target.

6. The method of claim 1 wherein selection of the geometric median comprises the steps of
   calculating an approximate horizontal median point of said target; and
   calculating a vertical median point of said target.

7. The method of claim 6 wherein calculation of an approximate horizontal median point of said target comprises the steps:
   (a) identifying horizontal center of said scene;
   (b) determining the number of contiguous scene lines horizontally spanned by the target;
   (c) calculating the total area of said target lying to the right of said horizontal center;
   (d) calculating the total area of said target lying to the left of said horizontal center;

(e) subtracting the area determined in (d) above from the area determined in (c) above;
(f) dividing the area determined in (e) above by two times the number of scene lines horizontally spanned by the target and determined in (b) above;
(g) subtracting the quantity determined in (f) above from the quantity representing the horizontal center of the scene (given in (a) above); and
(h) designating and using the quantity determined in (g) as the estimate of the horizontal median point of the target.

8. The method of claim 7 further comprising the steps of:
(i) substituting the estimate of the horizontal median point of the target as designated in (h) above for the value of the horizontal center as identified in (a) above; and
(j) iterating steps (a) through (i) to achieve improved accuracy of the estimate resulting in step (h).

9. The method of claim 6 wherein calculation of a vertical median point of said target comprises the steps of:
(a) calculating the total scene area covered by said target;
(b) initializing a variable to zero;
(c) selecting that numbered horizontal line in which a portion of the target first appears and recording that number;
(d) adding the area covered by said target on said numbered horizontal line to said variable;
(e) comparing the quantity obtained in (d) to one half the area calculated in (a) plus one;
(f) designating the numbered horizontal line number as the vertical median if the quantity determined in (d) is greater than or equal to the area calculated in (a) plus 1; and
(g) incrementing the numbered horizontal line number by one and returning to step (d) if the quantity determined in (d) is less than the area calculated in (a) plus one.

* * * * *